United States Patent
Yu et al.

(10) Patent No.: US 10,952,131 B2
(45) Date of Patent: Mar. 16, 2021

(54) INTERCONNECTION METHOD AND SYSTEM BASED ON WI-FI AWARE PROTOCOL, AND MASTER DEVICE IN NAN GROUP

(71) Applicant: TCL Communications (Ningbo) Co., Ltd., Ningbo (CN)

(72) Inventors: Longjie Yu, Ningbo (CN); Hai Cai, Ningbo (CN)

(73) Assignee: TCL Communications (Ningbo) Co., Ltd., Ningbo (CN)

( * ) Notice: Subject to any disclaimer, the term of this patent is extended or adjusted under 35 U.S.C. 154(b) by 65 days.

(21) Appl. No.: 16/483,421

(22) PCT Filed: Jan. 31, 2018

(86) PCT No.: PCT/CN2018/074793
§ 371 (c)(1),
(2) Date: Aug. 4, 2019

(87) PCT Pub. No.: WO2018/141248
PCT Pub. Date: Aug. 9, 2018

(65) Prior Publication Data
US 2020/0015152 A1 Jan. 9, 2020

(30) Foreign Application Priority Data
Feb. 3, 2017 (CN) .......................... 201710063455.1

(51) Int. Cl.
*H04W 48/16* (2009.01)
*H04W 48/10* (2009.01)
(Continued)

(52) U.S. Cl.
CPC .......... *H04W 48/16* (2013.01); *H04W 48/10* (2013.01); *H04W 56/001* (2013.01); *H04W 80/08* (2013.01); *H04W 84/18* (2013.01)

(58) Field of Classification Search
CPC combination set(s) only.
See application file for complete search history.

(56) References Cited

U.S. PATENT DOCUMENTS 8,055,756 B2 * 11/2011 Kim ...................... H04L 41/046
709/224
9,723,464 B2   8/2017 Patil et al.
(Continued)

FOREIGN PATENT DOCUMENTS

| CN | 105637907 | 6/2016 |
| CN | 106851775 | 6/2017 |
| WO | WO 2018/141248 | 8/2018 |

OTHER PUBLICATIONS

International Search Report and the Written Opinion dated May 2, 2018 From the International Searching Authority Re. Application No. PCT/CN2018/074793 and Its Translation of Search Report Into English. (9 Pages).

*Primary Examiner* — Maharishi V Khirodhar
*Assistant Examiner* — Kenneth P Hunt

(57) ABSTRACT

An interconnection method comprises: a master device in a NAN group sends a discovery beacon frame outside a sending window, and a peripheral device joins the NAN group on the basis of the discovery beacon frame; the master device or a non-master synchronization device in the NAN group sends a synchronization beacon frame in a sending window to synchronize the clocks of the devices in the entire NAN group; a device in the NAN group acquires upper-level application information of other devices by means of a service discovery frame, and generates a NAN group device application statistical table locally in the device to complete networking; two or more devices in the NAN group start an upper layer application by means of looking up the NAN group device application statistical table.

10 Claims, 2 Drawing Sheets

(51) Int. Cl.
*H04W 56/00* (2009.01)
*H04W 80/08* (2009.01)
*H04W 84/18* (2009.01)

(56) References Cited

U.S. PATENT DOCUMENTS

| | | | |
|---|---|---|---|
| 2011/0149806 A1* | 6/2011 | Verma | H04L 67/12 |
| | | | 370/255 |
| 2014/0258395 A1* | 9/2014 | Tng | H04W 8/005 |
| | | | 709/204 |
| 2015/0098388 A1* | 4/2015 | Fang | H04W 48/18 |
| | | | 370/328 |
| 2015/0109961 A1 | 4/2015 | Patil et al. | |
| 2015/0117430 A1* | 4/2015 | Zhuang | H04L 67/16 |
| | | | 370/338 |
| 2016/0198494 A1 | 7/2016 | Huang et al. | |
| 2016/0323801 A1* | 11/2016 | Serita | H04W 40/24 |
| 2017/0034769 A1* | 2/2017 | Kim | H04W 48/10 |

* cited by examiner

INTERCONNECTION METHOD AND SYSTEM BASED ON WI-FI AWARE PROTOCOL, AND MASTER DEVICE IN NAN GROUP

RELATED APPLICATIONS

This application is a National Phase of PCT Patent Application No. PCT/CN2018/074793 having International filing date of Jan. 31, 2018, which claims the benefit of priority of Chinese Patent Application No. 201710063455.1 filed on Feb. 3, 2017. The contents of the above applications are all incorporated by reference as if fully set forth herein in their entirety.

FIELD AND BACKGROUND OF THE INVENTION

The present disclosure relates to the field of Internet of Things (JOT) networking, more particularly, to a Wi-Fi Aware protocol based interconnection method, a system and a master device in a neighbor awareness networking (NAN) group.

At present, as the concept of smart homes deepens more and more, an increasing number of smart devices appear in homes, such as smart phones, tablet computers, PCs, smart TVs, smart air conditioners, smart refrigerators, smart washing machines, wireless printers, wireless speakers, etc. These smart homes are basically equipped with Wi-Fi and Bluetooth.

At the same time, the concept of Family Internet of Things is gradually emerging. The more common IoT networking solution is to use routers or gateways as the central equipment of the IoT. Many smart homes join the IoT through Wi-Fi networks. However, this solution has one drawback. Once the central equipment of the IoT leaves the network or cannot work, the whole IoT will be paralyzed. Therefore, the operations of IoT in the related art rely on the central equipment, and the IoT is no longer effective if there is a problem with the central equipment.

SUMMARY OF THE INVENTION

The present disclosure provides a Wi-Fi Aware protocol based interconnection method and a system, which can resolve the technical problem that the operations of IoT in the related art rely on the central equipment and the IoT is no longer effective if there is a problem with the central equipment.

The technical schemes of the present disclosure are as follows.

A Wi-Fi Aware protocol based interconnection method comprises:
  a master device in a NAN group sending a discovery beacon frame outside a transmission window through the Wi-Fi Aware protocol to discover a neighboring device, the neighboring device joining the NAN group according to the discovery beacon frame;
  the master device or a non-master sync device in the NAN group sending a synchronization beacon frame in the transmission window to synchronize clocks of devices in the whole NAN group;
  each of the devices in the NAN group obtaining upper layer application information of another device through a service discovery frame, and generating a NAN group device application statistics table locally in the device to complete networking of NAN group devices; and
  two or more devices in the NAN group starting an upper layer application through looking up the NAN group device application statistics table.

Optionally, the step of obtaining the upper layer application information of the another device through the service discovery frame, and generating the NAN group device application statistics table locally in the device by the each of the devices in the NAN group to complete networking of the NAN group devices comprises:
  the each of the devices of the NAN group broadcasting upper layer application information of the device itself through publishing a service discovery frame;
  the each of the devices of the NAN group obtaining the upper layer application information of the another device through subscribing to the service discovery frame of the another device of the NAN group; and
  the each of the devices of the NAN group generating the NAN group device application statistics table locally based on the upper layer application information of the device itself and the upper layer application information of the another device to complete networking of the NAN group devices.

Optionally, the step of starting the upper layer application through looking up the NAN group device application statistics table by the two or more devices in the NAN group comprises:
  a first device of the NAN group discovering a second device through looking up the NAN group device application statistics table; and
  the first device initiating a connection request to the second device, the first device and the second device starting the upper layer application.

Optionally, after the step of starting the upper layer application through looking up the NAN group device application statistics table by the two or more devices in the NAN group the interconnection method comprises:
  the non-master sync device or the non-master non-sync device becoming a new master device based on a rank campaign when it is detected that the master device in the NAN group leaves the group.

Optionally, attributes of the service discovery frame are service description attributes and manufacturer-specific attributes.

A Wi-Fi Aware protocol based interconnection system comprises:
  one or more processors;
  a memory; and
  one or more application programs, wherein the one or more application programs are stored in the memory and are configured to be executed by the processor, the one or more application programs comprise:
  a device discovery module configured to allow a master device in a NAN group to send a discovery beacon frame outside a transmission window through the Wi-Fi Aware protocol and discover a neighboring device, and the neighboring device joining the NAN group according to the discovery beacon frame;
  a synchronization module configured to allow the master device or a non-master sync device in the NAN group to send a synchronization beacon frame in the transmission window so as to synchronize clocks of devices in the whole NAN group;
  a networking module configured to allow each of devices in the NAN group to obtain upper layer application information of another device through a service discovery frame, and generate a NAN group device application statistics table locally in the device to complete networking of NAN group devices; and an upper layer application start module configured to allow two or more devices in the NAN group to start an upper layer application through looking up the NAN group device application statistics table.

Optionally, the networking module comprises:

an application information broadcast unit configured to allow the each of the devices of the NAN group to broadcast upper layer application information of the device itself through publishing a service discovery frame;

an application information acquisition unit configured to allow the each of the devices of the NAN group to obtain the upper layer application information of the another device through subscribing to the service discovery frame of the another device of the NAN group; and a networking unit configured to allow the each of the devices of the NAN group to generate the NAN group device application statistics table locally based on the upper layer application information of the device itself and the upper layer application information of the another device to complete networking of the NAN group devices.

Optionally, the upper layer application start module comprises:

a device discovery unit configured to allow a first device of the NAN group to discover a second device through looking up the NAN group device application statistics table; and an application start unit configured to allow the first device to initiate a connection request to the second device, the first device and the second device starting the upper layer application.

Optionally, the interconnection system further comprises:

a master device campaign unit configured to allow the non-master sync device or the non-master non-sync device to become a new master device based on a rank campaign when it is detected that the master device in the NAN group leaves the group.

Optionally, attributes of the service discovery frame are service description attributes and manufacturer-specific attributes.

A master device in a neighbor awareness networking (NAN) group comprises:

one or more processors;
a memory; and
one or more application programs, wherein the one or more application programs are stored in the memory and are configured to be executed by the processor to perform operations, the operations comprise:

sending, by the master device, a discovery beacon frame outside a transmission window through the Wi-Fi Aware protocol to discover a neighboring device, the neighboring device joining the NAN group according to the discovery beacon frame;

sending, by the master device or a non-master sync device in the NAN group, a synchronization beacon frame in the transmission window, and each of devices sending at most once in one transmission window to synchronize clocks of devices in the whole NAN group;

obtaining, by each of the devices in the NAN group, upper layer application information of another device through a service discovery frame, and generating a NAN group device application statistics table locally in the device to complete networking of NAN group devices; and two or more devices in the NAN group starting an upper layer application through looking up the NAN group device application statistics table.

Optionally, the operation of obtaining the upper layer application information of the another device through the service discovery frame, and generating the NAN group device application statistics table locally in the device by the each of the devices in the NAN group to complete networking of the NAN group devices comprises:

broadcasting, by the each of the devices of the NAN group, upper layer application information of the device itself through publishing a service discovery frame;

obtaining, by the each of the devices of the NAN group, the upper layer application information of the another device through subscribing to the service discovery frame of the another device of the NAN group; and generating, by the each of the devices of the NAN group, the NAN group device application statistics table locally based on the upper layer application information of the device itself and the upper layer application information of the another device to complete networking of the NAN group devices.

Optionally, the operation of starting the upper layer application through looking up the NAN group device application statistics table by the two or more devices in the NAN group comprises:

Discovering, by a first device of the NAN group, a second device through looking up the NAN group device application statistics table; and the first device initiating a connection request to the second device, the first device and the second device starting the upper layer application.

Optionally, after the operation of starting the upper layer application through looking up the NAN group device application statistics table by the two or more devices in the NAN group, the master device further performs an operation of:

determining the non-master sync device or the non-master non-sync device as a new master device based on a rank campaign when it is detected that the master device in the NAN group leaves the group.

Optionally, attributes of the service discovery frame are service description attributes and manufacturer-specific attributes.

The present disclosure provides a Wi-Fi Aware protocol based interconnection method, a system and a master device in a NAN group. The present disclosure allows multiple devices to be automatically networked through Wi-Fi. After networking is completed, two or more devices can rapidly and effectively start the upper layer application. The operation is simple and it's convenient to use.

BRIEF DESCRIPTION OF THE SEVERAL VIEWS OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SPECIFIC EMBODIMENTS OF THE INVENTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The present disclosure mainly operates based on the Wi-Fi Aware protocol. First, a general description is provided for the Wi-Fi Aware protocol. The Wi-Fi Aware protocol is a protocol based on adjacent positions. That is, devices in a Wi-Fi Aware group can discover other devices and their services without establishing a Wi-Fi connection. Therefore, the Wi-Fi Aware protocol is also called the Wi-Fi NAN (Neighbor Awareness Networking) protocol. As compared with the common Wi-Fi protocol, the Wi-Fi Aware protocol has the advantages of stability and low power consumption in networking, and can be applied to the Internet of Things that includes smart homes.

Figure 1:
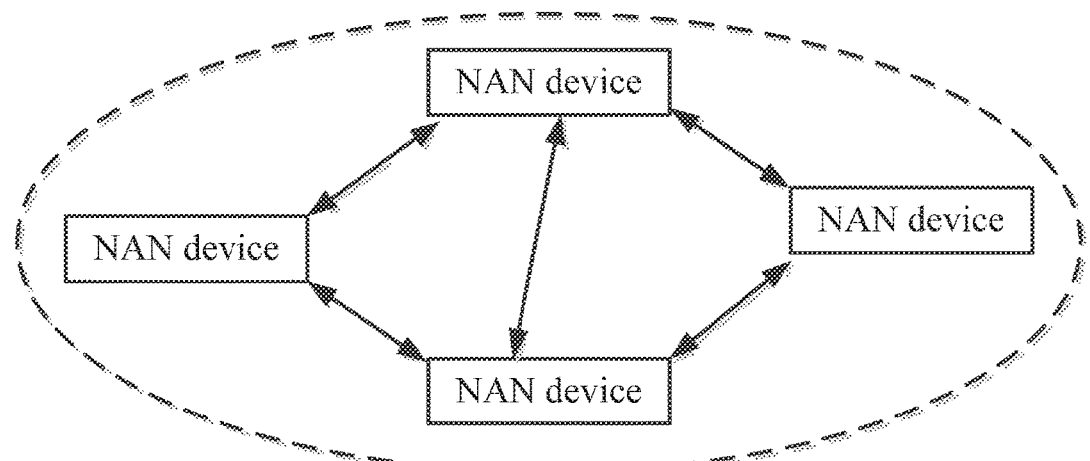
FIG. 1 is a schematic diagram of a NAN group of a Wi-Fi Aware protocol based interconnection method according to one embodiment of the present disclosure.

All NAN devices in the Wi-Fi Aware group keep a synchronous clock and are on a same channel. A typical NAN group is shown in FIG. 1. In this group, a device can send information to not only another device but also multiple devices. A transmission range of the NAN group is the same as a common Wi-Fi. Each NAN group has a number that is used to distinguish different groups. Each device in the NAN group has an interface address that is used to distinguish different devices.

In the NAN group, the NAN devices can be divided into three categories, namely, a master device, a non-master sync device, and a non-master non-sync device. The master device is the first device in the NAN group that sends a discovery beacon frame. The types of the non-master sync device and the non-master non-sync device are randomly allocated. Table 1 shows the types of the NAN devices and their corresponding transceiving frames.

TABLE 1

| | Discovery Beacon Frame | Synchronization Beacon Frame | Service Discovery Frame |
|---|---|---|---|
| Master | Tx, Rx | Tx, Rx | Tx, Rx |
| Non-Master Sync | Rx | Tx, Rx | Tx, Rx |
| Non-Master Non-Sync | Rx | Rx | Tx, Rx |

Wi-Fi Aware operations refer to actions performed when the NAN device joins the Wi-Fi Aware group, which include device discovery, clock synchronization, and service discovery.

Figure 3:
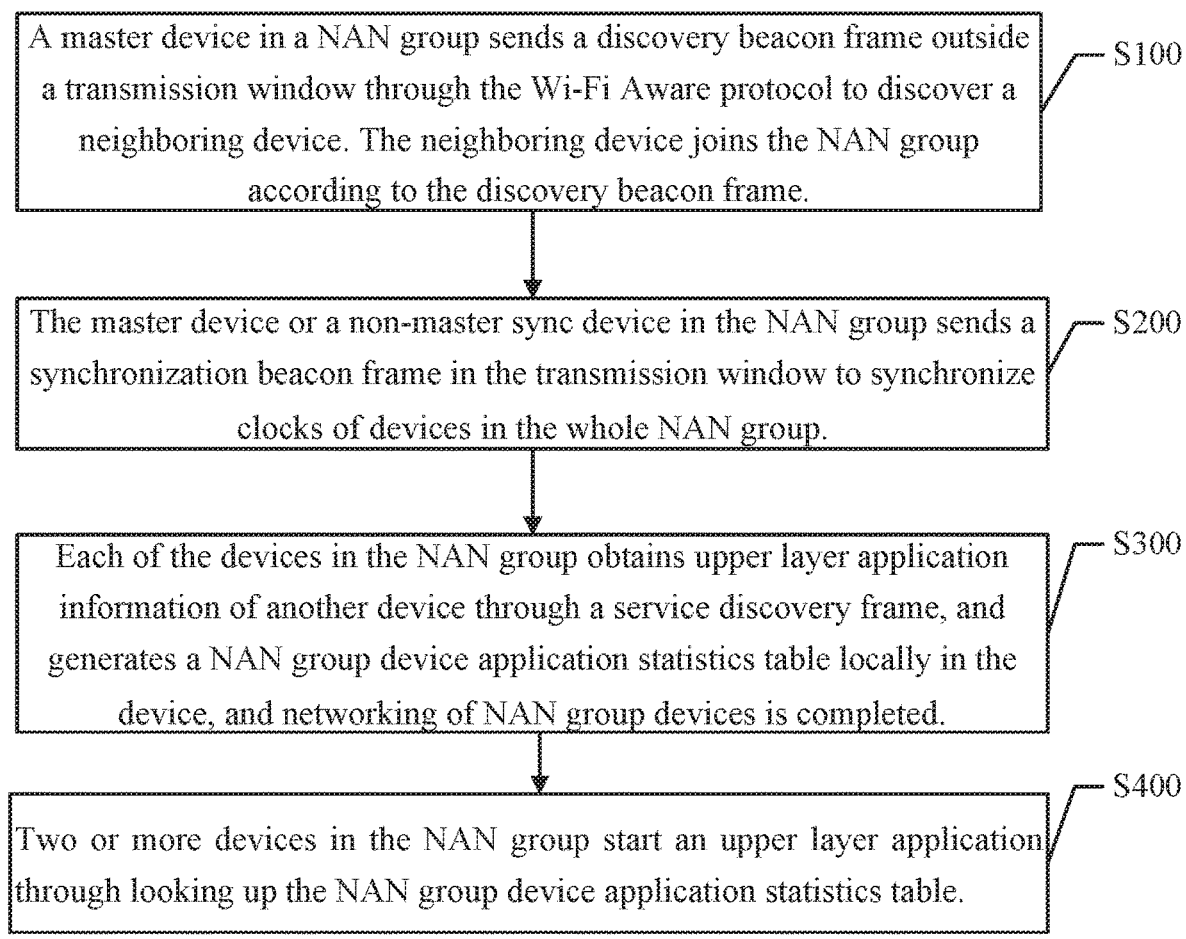
FIG. 3 is a flowchart of a Wi-Fi Aware protocol based interconnection method according to a preferred embodiment of the present disclosure.

The present disclosure further provides a flowchart of a Wi-Fi Aware protocol based interconnection method according to a preferred embodiment. As shown in FIG. 3, the method comprises the steps as follows.

S100: A master device in a NAN group sends a discovery beacon frame outside a transmission window through the Wi-Fi Aware protocol to discover a neighboring device. The neighboring device joins the NAN group according to the discovery beacon frame.

In greater detail, the master device sends the discovery beacon frame outside the transmission window, and the objective of which is to discover a device not in the NAN group.

A format of the NAN discovery beacon frame is shown in Table 2. Here "FC (Frame Control)" refers to frame control. "Duration" refers to a duration of a beacon frame. "A1" refers to a broadcast address, that is, the MAC address 51-6F 9A 01-00-00. "A2" refers to a MAC address of a sender. "A3" refers to a number of the NAN group, that is, a random MAC address between 50-6F-9A-01-00-00 and 50-6F-9A-01-FF-FF. "Seq.Ctrl. (Sequence Control)" refers to sequence control. "Time Stamp" refers to a timestamp of the beacon frame. "Beacon Interval" refers to a beacon interval. "Capability" refers to capacity information. "IE (Information Element)" refers to a NAN information element. "FCS (Frame Checksum)" refers to a checksum of the beacon frame.

Figure 2:
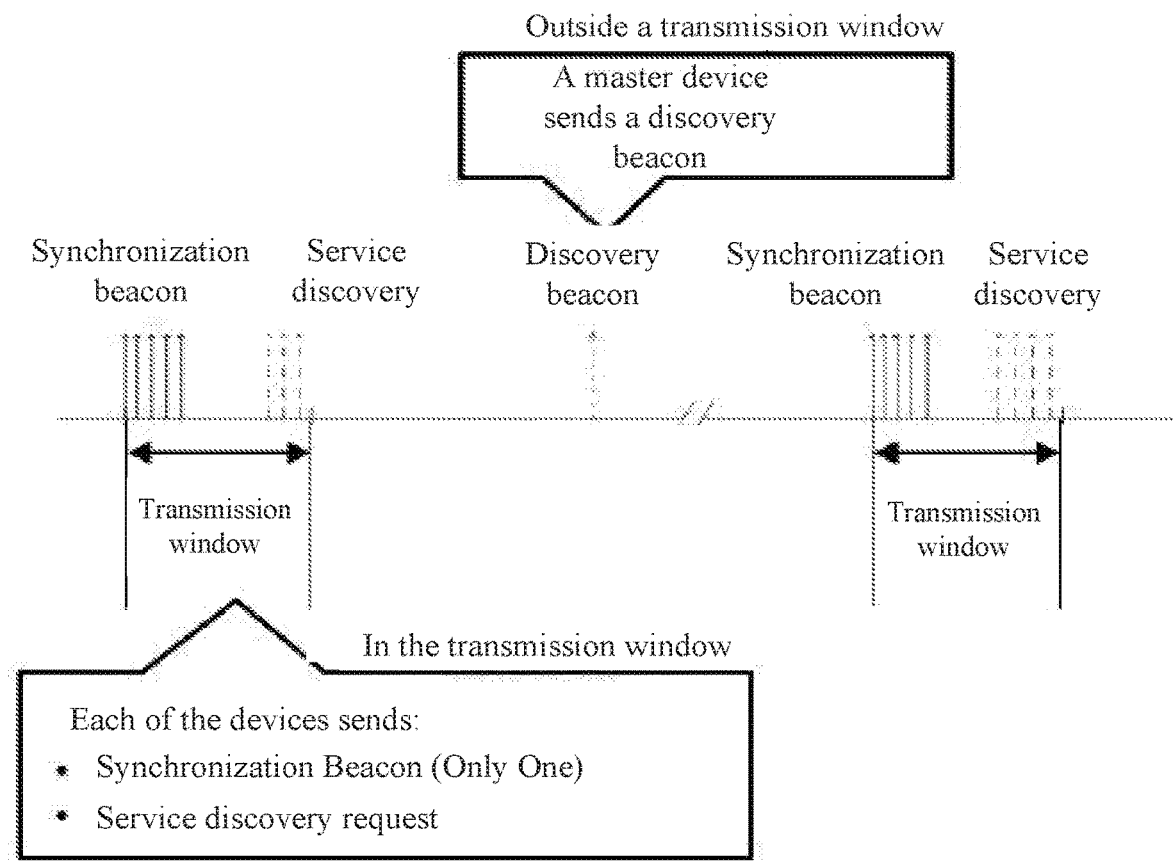
FIG. 2 is a timing diagram of NAN operations of a Wi-Fi Aware protocol based interconnection method according to one embodiment of the present disclosure.

Timing corresponding to each operation is shown in FIG. 2. Table 2 shows a format of a NAN synchronization beacon frame (that is, the format of the NAN discovery beacon frame is the same as a format of the synchronization beacon frame). The master device sends the discovery beacon frame outside the transmission window, and sends a synchronization beacon frame and a service discovery frame in the transmission window. The non-master sync device sends the synchronization beacon frame and the service discovery frame in the transmission window. The non-master non-sync device sends the service discovery frame in the transmission window.

TABLE 2

| Field | FC | Duration | A1 | A2 | A3 | Seq. Ctrl. | Time Stamp | Beacon Interval | Capability | IE | FCS |
|---|---|---|---|---|---|---|---|---|---|---|---|
| Value Size/Bytes | 2 | 2 | 6 | 6 | 6 | 2 | 8 | 2 | 2 | Var. | 4 |

A format of the NAN information element (IE) is shown in Table 3. Table 3 shows the format of the NAN information element. Here "Element ID" refers to a number of an information element specified by IEEE 802.11. "Length" refers to a total byte length of OUI, OUI type and Attributes. "OUI" refers to an organizationally unique identifier. "OUI Type" refers to a type of the information element. "Attributes" refers to attributes.

TABLE 3

| Field | Element ID | Length | OUI | OUI Type | Attributes |
|---|---|---|---|---|---|
| Value | 0xDD | x + 4 | 0x50-6F-9A | 0x13 | var. |
| Size/Bytes | 1 | 1 | 3 | 1 | X |

A general format of the NAN attributes (Attributes) is the format shown in Table 4.

TABLE 4

| Field | ID | Length | Body Field | ... | ID | Length | Body Field |
|---|---|---|---|---|---|---|---|
| Value | | x1 | | ... | | x2 | |
| Size/Bytes | 1 | 2 | x1 | ... | 1 | 2 | x2 |

Here "ID" refers to a number of a NAN attribute. Types of attribute IDs and their corresponding frame types are shown in Table 5. "Length" indicates a length of a Body Field. "Body Field" refers to content of an attribute".

TABLE 5

| Attribute ID | Description | Discovery Beacon Frame | Synchronization Beacon Frame | Service Discovery Frame |
|---|---|---|---|---|
| 0 | Master Device Display Attribute | YES/M | YES/M | NO |
| 1 | Group Attribute | YES/M | YES/M | NO |
| 2 | Service Number List Attribute | YES/O | YES/O | NO |
| 3 | Service Description Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Future NAN Service Discovery Attribute | NO | NO | YES/O |
| 10 | Future Valid Map Attribute | NO | NO | YES/O |
| 11 | Country Code Attribute | YES/O | YES/O | YES/O |
| 12 | Range Attribute | NO | NO | YES/O |
| 13 | Group Discovery Attribute | NO | NO | NO |
| 14-220 | Reserved Text | NA | NA | NA |
| 221 | Manufacturer-specific Attribute | YES/O | YES/O | YES/O |
| 222-255 | Reserved Text | NA | NA | NA |

In Table 5, "YES/M" indicates that the frame must comprise the attribute. "YES/O" indicates that the frame can optionally comprise the attribute. "NO" indicates that the frame does not comprise the attribute. "NA" indicates not applicable (invalid).

S200: The master device or a non-master sync device in the NAN group sends a synchronization beacon frame in the transmission window to synchronize clocks of devices in the whole NAN group.

In greater detail, in one NAN group, the master device and the non-master sync device send the synchronization beacon frame in the transmission window, and each of the devices sends at most once in one transmission window. The objective of clock synchronization is to keep the clocks of all the devices in the group consistent, which can reduce delay and power consumption.

A format of the NAN synchronization beacon frame is the same as the format of the NAN discovery beacon frame, and reference may be made to the format of the discovery beacon frame in the device discovery of step S100.

Step 300: Each of the devices in the NAN group obtains upper layer application information of another device through a service discovery frame, and generates a NAN group device application statistics table locally in the device, and networking of NAN group devices is completed.

In greater detail, attributes of the service discovery frame are specifically service description attributes and manufacturer-specific attributes. Each of the devices in the NAN group can send the service discovery frame. The objective is to let the device publish its own services and subscribe to services of another device.

A format of a NAN service discovery frame is shown in Table 6. Here "Category" indicates that a type of the frame is a Public Action Frame. "Action Field" indicates a common action frame related to a specified manufacturer. "OUI" refers to an Organizationally Unique Identifier. "OUI Type" refers to a type of OUI. "Attributes" refers to attributes.

TABLE 6

| Field | Category | Action Field | OUI | OUI Type | Attributes |
|---|---|---|---|---|---|
| Value | 0x04 | 0x09 | 0x50-6F-9A | 0x13 | var. |
| Size/Bytes | 1 | 1 | 3 | 1 | var. |

Reference may be made to Table 4 and Table 5 for attributes in the service discovery frame. That is, the service discovery frame must comprise the service description attribute, and may optionally comprise the NAN connection capability attribute, the WLAN infrastructure attribute, the P2P operation attribute, the IBSS attribute, the Mesh attribute, the future NAN service discovery attribute, the future valid map attribute, the country code attribute, the range attribute, and the manufacturer-specific attribute.

Each of the NAN devices utilizes the service discovery frames to send and receive information specified by the present disclosure with one another. Therefore, for the present disclosure, the attributes of the service discovery frame are specified as only the service description attributes and the manufacturer-specific attributes on the basis that the Wi-Fi NAN protocol is fulfilled.

The service description attribute occupies a minimum of 12 bytes.

A format of the manufacturer-specific attribute is shown in Table 7. Here, "Attribute ID" refers to a number of the manufacturer-specific attribute. "Length" refers to a total byte length of OUI and Body. "OUI" refers to a number of a manufacturer. "Body" refers to specific information of the manufacturer, which is used as the information specified by the present disclosure.

TABLE 7

| Field | Attribute ID | Length | OUI | Body |
|---|---|---|---|---|
| Value | 0xDD | x + 3 | | |
| Size/Bytes | 1 | 2 | 3 | x |

A format of the service discovery frame sent by any one of the NAN devices is as shown in Table 8 under the mechanism described in the present disclosure.

TABLE 8

| Field | Category | Action Field | OUI | OUI Type | Attributes |
|---|---|---|---|---|---|
| Value | 0x04 | 0x09 | 0x50-6F-9A | 0x13 | var. |
| Size/Bytes | 1 | 1 | 3 | 1 | var. |

TABLE 8-1

| | Service Description Attribute | Manufacturer-specific Attribute | | | |
|---|---|---|---|---|---|
| Attributes | | Attribute ID | Length | OUI | Body |
| Value | | 0xDD | x + 3 | | |
| Size/Bytes | 12 | 1 | 2 | 3 | x |

In a further embodiment, step S300 specifically comprises the steps as follows.

S301: Each of the devices of the NAN group broadcasts the upper layer application information of the device itself through publishing a service discovery frame.

S302: Each of the devices of the NAN group obtains the upper layer application information of the another device through subscribing to the service discovery frame of the another device of the NAN group.

S303: Each of the devices of the NAN group generates the NAN group device application statistics table locally based on the upper layer application information of the device itself and the upper layer application information of the another device, and networking of the NAN group devices is completed.

In greater detail, categories and related information of the upper layer applications specified by the present disclosure are shown in Table 9. Here, "Application ID" refers to the category of the application and a total of 10 categories are defined, "Role" refers to a role of the device played in the application, "0x01" is an application initiator, "0x00" is an application receiver, "MAC address" refers to Wi-Fi of the device or a MAC address of Bluetooth (BT), as shown in Table 9.

TABLE 9

| Application ID | Role | MAC Address | Description |
|---|---|---|---|
| 0x00 | 0x00 | | Transfer a photo by using WiFi Direct |
| 0x01 | 0x01 | | Transfer a video by using Wi-Fi Display |
| 0x02 | 0x01 | | Transfer a file by using Wi-Fi LAN |
| 0x03 | 0x00 | | Transfer a photo by using Bluetooth |
| ... | ... | ... | ... |
| 0x09 | 0x00 | | Transfer an audio file by using Bluetooth |

In order to better understand the scheme of the present disclosure, the service discovery frame described in Table 8 is simplified here, as shown in Table 10. The Body field in Table 10 is the Body field in Table 8.

TABLE 10

| | Body | | | | | |
|---|---|---|---|---|---|---|
| | Application 1 | | | Application 2 | | |
| Field | Application ID | Role | MAC Address | Application ID | Role | MAC Address | ... |
| Value Size/Bytes | 1 | 1 | 6 | 1 | 1 | 6 | ... |

Each of the devices in the NAN group can broadcast its own upper layer application information through publishing the service discovery frame. Through subscribing to the service discovery frame of the another device, the upper layer application information of the another device can be obtained, thus forming the NAN group device application statistics table locally, as shown in Table 11.

TABLE 11

| Device | Application a1 | | | Application a2 | | | ... |
|---|---|---|---|---|---|---|---|
| 1 | Application ID | Role | MAC Address | Application ID | Role | MAC Address | ... |
| Device | Application b1 | | | Application b2 | | | ... |
| 2 | Application ID | Role | MAC Address | Application ID | Role | MAC Address | ... |
| ... | | | | | | | |
| Device | Application c1 | | | Application c2 | | | |
| n | Application ID | Role | MAC Address | Application ID | Role | MAC Address | |

At this point, the networking of NAN devices is completed. Each of the devices in the NAN group has a NAN group device application statistics table locally, and the remaining devices still maintain the network and can dynamically update the NAN group device application statistics table when any of the devices in the group leaves the group.

S400: Two or more devices in the NAN group start an upper layer application through looking up the NAN group device application statistics table.

In practical implementation, two or more devices can look up the NAN group device application statistics table to quickly start the upper layer application after the NAN device networking is completed.

In a further embodiment, step 400 specifically comprises the steps as follows.

S401: A first device of the NAN group discovers a second device through looking up the NAN group device application statistics table.

S402: The first device initiates a connection request to the second device. The first device and the second device start the upper layer application.

In practical implementation, two devices in the NAN group start the upper layer application. One typical application scenario is to transfer a photo by using WiFi Direct. It is assumed that a device A is an initiator of an application k and a device B is a receiver of the application k. A service discovery frame of the device A is shown in Table 12, and a service discovery frame of the device B is as shown in Table 13. Then, the device A discovers the device B through looking up the NAN group device application statistics table and directly initiates a connection request of the application k to the device B, so that the device A and the device B start the upper layer application.

TABLE 12

| | | Body | | | |
|---|---|---|---|---|---|
| | | Application k | | | |
| Field | ... | Application ID | Role | MAC Address | ... |
| Value | ... | K | 0x01 | | ... |
| Size/Bytes | ... | 1 | 1 | 6 | ... |

TABLE 13

| | | Body | | | |
|---|---|---|---|---|---|
| | | Application k | | | |
| Field | ... | Application ID | Role | MAC Address | ... |
| Value | ... | K | 0x00 | | ... |
| Size/Bytes | ... | 1 | 1 | 6 | ... |

When multiple devices start the upper layer application, a typical application scenario is to transmit a file on the Wi-Fi LAN. That is, one device is used as a Wi-Fi hotspot, and the other devices are connected to the hotspot. All devices exchange the file in the LAN. It is assumed that a device A is a receiver of an application j, and a device B and a device C are initiators of the application j. A service discovery frame of the device A is shown in Table 14, a service discovery frame of the device B is as shown in Table 15, and a service discovery frame of the device C is as shown in Table 16. Then, the device B and the device C discover the device A through looking up the NAN group device application statistics table and initiate a connection request of the application j to the device A, so that the device A, the device B and the device C start the upper layer application.

TABLE 14

| | | Body | | | |
|---|---|---|---|---|---|
| | | Application j | | | |
| Field | ... | Application ID | Role | MAC Address | ... |
| Value | ... | J | 0x00 | | ... |
| Size/Bytes | ... | 1 | 1 | 6 | ... |

TABLE 15

| | | Body | | | |
|---|---|---|---|---|---|
| | | Application j | | | |
| Field | ... | Application ID | Role | MAC Address | ... |
| Value | ... | J | 0x01 | | ... |
| Size/Bytes | ... | 1 | 1 | 6 | ... |

TABLE 16

| | | Body | | | |
|---|---|---|---|---|---|
| | | Application j | | | |
| Field | ... | Application ID | Role | MAC Address | ... |
| Value | ... | J | 0x01 | | ... |
| Size/Bytes | ... | 1 | 1 | 6 | ... |

In a further embodiment, the following step is further comprised after step S400:

S500: When it is detected that the master device in the NAN group leaves the group, the non-master sync device or the non-master non-sync device becomes a new master device based on a rank campaign.

In practical implementation, the master device can be replaced. In other words, the non-master sync device or the non-master non-sync device can become the new master device based on the rank campaign when the master device leaves the group without destroying the original group, which is also a big advantage of the NAN protocol. Rankings of the non-master sync device and the non-master non-sync device are randomly assigned when the devices join the NAN group.

It is thus understood from the above method embodiments that the present disclosure provides a Wi-Fi Aware protocol based interconnection method. The master device discovers the device(s), and the master device and the non-master sync device synchronize clocks. The master device, the non-master sync device, and the non-master non-sync device discover services of one another, so that all the devices join the NAN group and exchange information and generate a NAN group device application statistics table locally.

Two or more devices in the group can quickly start the upper layer application according to the application statistics table. At the same time, the advantage of the Wi-Fi Aware protocol is that after any device in the NAN group is disconnected from the network, the remaining devices can still maintain the group and operate normally. In the mechanism described in the present disclosure, the NAN device is automatically networked. After the networking, two or more devices can quickly start the upper layer application, and the operation is simple and convenient for users.

In an exemplary embodiment, the device may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or some other electronic components so as to perform the above method.

In an exemplary embodiment, a non-transitory computer readable storage medium comprising instructions is further provided, such as a memory comprising instructions. The instructions can be executed by a processor of the device to perform the above method. For example, the non-transitory computer readable storage medium may be a red only memory (ROM), a random access memory (RAM), a compact disc read only memory (CD-ROM), a magnetic tape, a floppy disk, or an optical data storage device, etc.

Figure 4:
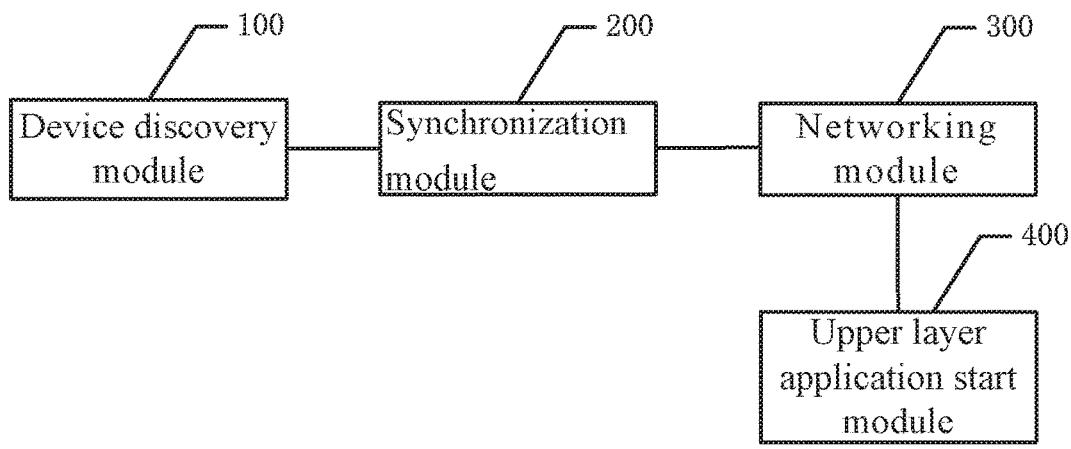
FIG. 4 is a block diagram showing a functional principle of a Wi-Fi Aware protocol based interconnection method according to a preferred embodiment of the present disclosure.

The present disclosure further provides a block diagram showing a functional principle of a Wi-Fi Aware protocol based interconnection system according to a preferred embodiment of the present disclosure. As shown in FIG. 4, the system comprises a device discovery module 100, a synchronization module 200, a networking module 300, and an upper layer application start module 400.

The device discovery module 100 is configured to allow a master device in a NAN group to send a discovery beacon frame outside a transmission window through the Wi-Fi Aware protocol and discover a neighboring device, and the neighboring device joining the NAN group according to the discovery beacon frame. The operation of the device discovery module 100 is similar to and provided in the above embodiment of the method of the present disclosure.

The synchronization module 200 is configured to allow the master device or a non-master sync device in the NAN group to send a synchronization beacon frame in the transmission window so as to synchronize clocks of devices in the whole NAN group. The operation of the synchronization module 200 is similar to and provided in the above embodiment of the method of the present disclosure.

The networking module 300 is configured to allow each of the devices in the NAN group to obtain upper layer application information of another device through a service discovery frame, and generate a NAN group device application statistics table locally in the device, and networking of NAN group devices being completed. The operation of the networking module 300 is similar to and provided in the above embodiment of the method of the present disclosure.

The upper layer application start module 400 is configured to allow two or more devices in the NAN group to start an upper layer application through looking up the NAN group device application statistics table. The operation of the upper layer application start module 400 is similar to and provided in the above embodiment of the method of the present disclosure.

The networking module 300 of the Wi-Fi Aware protocol based interconnection system specifically comprises an application information broadcast unit, an application information acquisition unit, and a networking unit.

The application information broadcast unit is configured to allow each of the devices of the NAN group to broadcast upper layer application information of the device itself through publishing a service discovery frame. The operation of the application information broadcast unit is similar to and provided in the above embodiment of the method of the present disclosure.

The application information acquisition unit is configured to allow each of the devices of the NAN group to obtain the upper layer application information of the another device through subscribing to the service discovery frame of the another device of the NAN group. The operation of the application information acquisition unit is similar to and provided in the above embodiment of the method of the present disclosure.

The networking unit is configured to allow each of the devices of the NAN group to generate the NAN group device application statistics table locally based on the upper layer application information of the device itself and the upper layer application information of the another device, and networking of the NAN group devices being completed. The operation of the networking unit is similar to and provided in the above embodiment of the method of the present disclosure.

The upper layer application start module 400 of the Wi-Fi Aware protocol based interconnection system specifically comprises a device discovery unit and an application start unit.

The device discovery unit is configured to allow a first device of the NAN group to discover a second device through looking up the NAN group device application statistics table. The operation of the device discovery unit is similar to and provided in the above embodiment of the method of the present disclosure.

The application start unit is configured to allow the first device to initiate a connection request to the second device, the first device and the second device starting the upper layer application. The operation of the application start unit is similar to and provided in the above embodiment of the method of the present disclosure.

The Wi-Fi Aware protocol based interconnection system further comprises a master device campaign unit.

The master device campaign unit is configured to allow the non-master sync device or the non-master non-sync device to become a new master device based on a rank campaign when it is detected that the master device in the NAN group leaves the group. The operation of the master device campaign unit is similar to and provided in the above embodiment of the method of the present disclosure.

In the above Wi-Fi Aware protocol based interconnection system, attributes of the service discovery frame are specifically service description attributes and manufacturer-specific attributes.

The present disclosure also provides a master device in a neighbor awareness networking (NAN) group. The master device includes one or more processors, a memory, and one or more application programs. The one or more application programs are stored in the memory and are configured to be executed by the processor to perform operations. The operations comprise:

sending, by the master device, a discovery beacon frame outside a transmission window through the Wi-Fi Aware protocol to discover a neighboring device, the neighboring device joining the NAN group according to the discovery beacon frame;

sending, by the master device or a non-master sync device in the NAN group, a synchronization beacon frame in the transmission window, and each of devices sending at most once in one transmission window to synchronize clocks of devices in the whole NAN group;

obtaining, by each of the devices in the NAN group, upper layer application information of another device through a service discovery frame, and generating a NAN group device application statistics table locally in the device to complete networking of NAN group devices; and two or more devices in the NAN group starting an upper layer application through looking up the NAN group device application statistics table.

In conclusion, the present disclosure provides a Wi-Fi Aware protocol based interconnection method and system. The method includes: a master device in a neighbor awareness networking (NAN) group sending a discovery beacon frame outside a transmission window through the Wi-Fi Aware protocol to discover a neighboring device, the neighboring device joining the NAN group according to the discovery beacon frame; sending, by the master device or a non-master sync device in the NAN group, a synchronization beacon frame in the transmission window to synchronize clocks of devices in the whole NAN group; each of the devices in the NAN group obtaining upper layer application information of another device through a service discovery frame, and generating a NAN group device application statistics table locally in the device to complete networking of NAN group devices; two or more devices in the NAN group starting an upper layer application through looking up the NAN group device application statistics table. The present disclosure provides a Wi-Fi Aware protocol based interconnection method, a system and a master device in a NAN group. The present disclosure allows multiple devices to be automatically networked through Wi-Fi. After networking is completed, two or more devices can rapidly and effectively start the upper layer application. The operation is simple and it's convenient to use. Although the present disclosure takes Wi-Fi Aware protocol as the embodiments to perform the interconnection, other protocols that may achieve the same or similar results and effects are within the scope of the present disclosure.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. An interconnection method comprising:
    a master device in a neighbor awareness networking (NAN) group sending a discovery beacon frame outside a transmission window to discover a neighboring device, the neighboring device joining the NAN group according to the discovery beacon frame;
    sending, by the master device or a non-master sync device in the NAN group, a synchronization beacon frame in the transmission window to synchronize clocks of devices in the whole NAN group;
    each of the devices in the NAN group obtaining upper layer application information of another device through a service discovery frame, and generating a NAN group device application statistics table locally in the device to complete networking of NAN group devices; and
    two or more devices in the NAN group starting an upper layer application through looking up the NAN group device application statistics table.

2. The interconnection method as claimed in claim 1, wherein the step of obtaining the upper layer application information of the another device through the service discovery frame, and generating the NAN group device application statistics table locally in the device by the each of the devices in the NAN group to complete networking of the NAN group devices comprises:
    the each of the devices of the NAN group broadcasting upper layer application information of the device itself through publishing a service discovery frame;
    the each of the devices of the NAN group obtaining the upper layer application information of the another device through subscribing to the service discovery frame of the another device of the NAN group; and
    the each of the devices of the NAN group generating the NAN group device application statistics table locally based on the upper layer application information of the device itself and the upper layer application information of the another device to complete networking of the NAN group devices.

3. The interconnection method as claimed in claim 2, wherein the step of starting the upper layer application through looking up the NAN group device application statistics table by the two or more devices in the NAN group comprises:
    a first device of the NAN group discovering a second device through looking up the NAN group device application statistics table; and
    the first device initiating a connection request to the second device, the first device and the second device starting the upper layer application.

4. The interconnection method as claimed in claim 3, wherein after the step of starting the upper layer application through looking up the NAN group device application statistics table by the two or more devices in the NAN group the interconnection method comprises:
    the non-master sync device or the non-master non-sync device becoming a new master device based on a rank campaign when it is detected that the master device in the NAN group leaves the group.

5. The interconnection method as claimed in claim 1, wherein attributes of the service discovery frame are service description attributes and manufacturer-specific attributes.

6. A master device in a neighbor awareness networking (NAN) group comprising:
    one or more processors;
    a memory; and
    one or more application programs, wherein the one or more application programs are stored in the memory and are configured to be executed by the processor to perform operations, the operations comprise:
    sending, by the master device, a discovery beacon frame outside a transmission window to discover a neighboring device, the neighboring device joining the NAN group according to the discovery beacon frame;
    sending, by the master device or a non-master sync device in the NAN group, a synchronization beacon frame in the transmission window, and each of devices sending at most once in one transmission window to synchronize clocks of devices in the whole NAN group;
    obtaining, by each of the devices in the NAN group, upper layer application information of another device through a service discovery frame, and generating a NAN group device application statistics table locally in the device to complete networking of NAN group devices; and
    two or more devices in the NAN group starting an upper layer application through looking up the NAN group device application statistics table.

7. The master device in the NAN group as claimed in claim 6, wherein the operation of obtaining the upper layer application information of the another device through the service discovery frame, and generating the NAN group device application statistics table locally in the device by the each of the devices in the NAN group to complete networking of the NAN group devices comprises:
    broadcasting, by the each of the devices of the NAN group, upper layer application information of the device itself through publishing a service discovery frame;
    obtaining, by the each of the devices of the NAN group, the upper layer application information of the another device through subscribing to the service discovery frame of the another device of the NAN group; and
    generating, by the each of the devices of the NAN group, the NAN group device application statistics table locally based on the upper layer application information of the device itself and the upper layer application information of the another device to complete networking of the NAN group devices.

8. The master device in the NAN group as claimed in claim 7, wherein the operation of starting the upper layer application through looking up the NAN group device application statistics table by the two or more devices in the NAN group comprises:

Discovering, by a first device of the NAN group, a second device through looking up the NAN group device application statistics table; and the first device initiating a connection request to the second device, the first device and the second device starting the upper layer application.

9. The master device in the NAN group as claimed in claim 8, wherein after the operation of starting the upper layer application through looking up the NAN group device application statistics table by the two or more devices in the NAN group, the master device further performs an operation of:

determining the non-master sync device or the non-master non-sync device as a new master device based on a rank campaign when it is detected that the master device in the NAN group leaves the group.

10. The master device in the NAN group as claimed in claim 6, wherein attributes of the service discovery frame are service description attributes and manufacturer-specific attributes.

* * * * *